(12) United States Patent
Hernandez Garcia

(10) Patent No.: US 10,427,391 B2
(45) Date of Patent: Oct. 1, 2019

(54) FORMULATION FOR PREPARING A POLYURETHANE FOAM

(71) Applicant: Dow Quimica Mexicana S.A. de C.V., Colonia Lomas de Chapultepec (MX)

(72) Inventor: Juan Hernandez Garcia, Tlaxcala (MX)

(73) Assignee: Dow Quimica Mexicana S.A. de C.V., Delegacion Cuauhtemoc (MX)

( * ) Notice: Subject to any disclaimer, the term of this patent is extended or adjusted under 35 U.S.C. 154(b) by 283 days.

(21) Appl. No.: 14/892,859

(22) PCT Filed: Dec. 19, 2014

(86) PCT No.: PCT/MX2014/000212
§ 371 (c)(1),
(2) Date: Dec. 6, 2016

(87) PCT Pub. No.: WO2015/183065
PCT Pub. Date: Dec. 3, 2015

(65) Prior Publication Data
US 2017/0096518 A1  Apr. 6, 2017

(30) Foreign Application Priority Data

May 29, 2014  (MX) .................... MX/a/2014/006476

(51) Int. Cl.
| | | |
|---|---|---|
| *C08L 67/07* | (2006.01) | |
| *B32B 27/40* | (2006.01) | |
| *C08G 18/10* | (2006.01) | |
| *C08G 18/76* | (2006.01) | |
| *C08G 18/79* | (2006.01) | |
| *B32B 5/20* | (2006.01) | |
| *B32B 27/06* | (2006.01) | |
| *C08G 18/48* | (2006.01) | |
| *C08G 18/63* | (2006.01) | |
| *C08G 18/72* | (2006.01) | |
| *C08G 18/18* | (2006.01) | |
| *C08G 18/32* | (2006.01) | |
| *C08G 18/40* | (2006.01) | |
| *B32B 7/04* | (2019.01) | |
| *B32B 15/04* | (2006.01) | |
| *B32B 21/04* | (2006.01) | |
| *B32B 21/14* | (2006.01) | |
| *B32B 27/32* | (2006.01) | |
| *B32B 29/00* | (2006.01) | |
| *C08G 101/00* | (2006.01) | |
| *B29K 75/00* | (2006.01) | |
| *B29L 9/00* | (2006.01) | |
| *B29C 44/14* | (2006.01) | |

(Continued)

(52) U.S. Cl.
CPC ................ *B32B 27/40* (2013.01); *B32B 5/20* (2013.01); *B32B 7/04* (2013.01); *B32B 15/046* (2013.01); *B32B 21/047* (2013.01); *B32B 21/14* (2013.01); *B32B 27/065* (2013.01); *B32B 27/32* (2013.01); *B32B 29/007* (2013.01); *C08G 18/10* (2013.01); *C08G 18/18* (2013.01); *C08G 18/3206* (2013.01); *C08G 18/4072* (2013.01); *C08G 18/4816* (2013.01); *C08G 18/4825* (2013.01); *C08G 18/4829* (2013.01); *C08G 18/4841* (2013.01); *C08G 18/632* (2013.01); *C08G 18/725* (2013.01); *C08G 18/7664* (2013.01); *C08G 18/7671* (2013.01); *C08G 18/797* (2013.01); *B29C 44/14* (2013.01); *B29K 2075/00* (2013.01); *B29K 2105/24* (2013.01); *B29K 2995/0015* (2013.01); *B29K 2995/0063* (2013.01); *B29K 2995/0088* (2013.01); *B29K 2995/0091* (2013.01); *B29L 2009/00* (2013.01); *B29L 2031/30* (2013.01); *B32B 2250/02* (2013.01); *B32B 2250/03* (2013.01); *B32B 2250/40* (2013.01); *B32B 2266/0278* (2013.01); *B32B 2307/50* (2013.01); *B32B 2307/536* (2013.01); *B32B 2307/56* (2013.01); *B32B 2307/72* (2013.01); *B32B 2307/732* (2013.01); *B32B 2605/00* (2013.01); *C08G 2101/0008* (2013.01); *C08G 2101/0058* (2013.01); *C08G 2101/0083* (2013.01); *C08G 2120/00* (2013.01)

(58) Field of Classification Search
CPC ............ C08G 18/4804; C08G 18/4812; C08G 18/4816; C08G 18/10; C08G 18/797; C08G 18/721; C08G 18/727
See application file for complete search history.

(56) References Cited

U.S. PATENT DOCUMENTS

| | | | | |
|---|---|---|---|---|
| 5,114,989 A | * | 5/1992 | Elwell .................... | C08G 18/10 521/137 |
| 5,216,035 A | * | 6/1993 | Harrison .............. | C08G 18/089 521/159 |
| 5,219,893 A | | 6/1993 | Konig et al. | |

(Continued)

FOREIGN PATENT DOCUMENTS

| | | | | |
|---|---|---|---|---|
| WO | 2009/098966 A1 | 8/2009 | | |
| WO | WO-2011090627 A1 | * | 7/2011 | ......... C08G 18/4072 |
| WO | WO-2012061496 A1 | * | 5/2012 | ......... C08G 18/7671 |

OTHER PUBLICATIONS

Machine Translation of WO 2009098966 A1 (Year: 2019).*

*Primary Examiner* — Michael M Dollinger

(57) ABSTRACT

A novel formulation for preparing a polyurethane foam with low density, desirable hardness, good appearance, and good adhesion to a polymer film without compromising the processing properties of the formulation; and a process for preparing a multilayer structure made of the polyurethane foam.

13 Claims, No Drawings

(51) Int. Cl.
   *B29L 31/30*       (2006.01)
   *B29K 105/24*      (2006.01)

(56) References Cited

U.S. PATENT DOCUMENTS

| | | | | |
|---|---|---|---|---|
| 5,236,960 | A * | 8/1993 | Harrison | C08G 18/089 |
| | | | | 252/182.22 |
| 6,022,903 | A * | 2/2000 | Younes | C08G 18/10 |
| | | | | 521/133 |
| 6,077,456 | A * | 6/2000 | Narayan | C08G 18/10 |
| | | | | 252/182.2 |
| 9,777,104 | B2 * | 10/2017 | Boehnke | C08G 18/7671 |
| 2003/0036578 | A1 * | 2/2003 | Arlt | C08G 18/4072 |
| | | | | 521/155 |
| 2004/0266900 | A1 * | 12/2004 | Neff | C08G 18/2825 |
| | | | | 521/155 |
| 2006/0293486 | A1 * | 12/2006 | Emmrich | C08G 18/10 |
| | | | | 528/44 |
| 2007/0237965 | A1 * | 10/2007 | Rosthauser | B29C 70/305 |
| | | | | 428/423.1 |
| 2007/0238800 | A1 * | 10/2007 | Neal | C08G 18/283 |
| | | | | 521/174 |
| 2013/0172435 | A1 * | 7/2013 | Otero Martinez | |
| | | | | C08G 18/4825 |
| | | | | 521/107 |
| 2013/0178548 | A1 * | 7/2013 | Aou | C08G 18/283 |
| | | | | 521/112 |
| 2013/0255880 | A1 * | 10/2013 | Mahdi | C08G 18/089 |
| | | | | 156/331.7 |
| 2013/0331473 | A1 * | 12/2013 | Motta | C08G 18/1875 |
| | | | | 521/160 |

* cited by examiner

FORMULATION FOR PREPARING A POLYURETHANE FOAM

FIELD OF THE INVENTION

The present invention relates to a formulation for preparing a polyurethane foam. The present invention also relates to a polyurethane foam which is suitable for automotive applications.

INTRODUCTION

Flexible polyurethane foams are widely used in many applications such as cushioning, thermal insulation, energy absorption and sealing. In particular, flexible polyurethane foams are useful for manufacturing automotive parts capable of absorbing energy.

For example, automotive fenders are for aesthetics as well as keeping dirt and road debris away from wheels and front braking systems. Polyurethane foam fenders usually comprise two polymer (for example, polyurethane or polyethylene) film layers and a layer of polyurethane foam residing in between. Polyurethane foams for use in fenders are required to have sufficient adhesion to the polymer film layers to avoid delamination of fenders.

Incumbent polyurethane foams for fenders usually have a density of from 120 to 150 kilograms per cubic meter (kg/m$^3$). It is desirable to reduce the density of polyurethane foams in order to reduce the cost and weight of the resultant fenders. Meanwhile, such density reduction should not compromise other properties such as hardness, surface appearance, and processing properties. Fenders are generally produced by molding. In such a process, a polymer film is placed into a mold. Polyol(s), isocyanate(s), blowing agent(s) and other optional additives are mixed to form a foam-forming formulation. Such foam-forming formulation is then injected into the mold, to which the polymer film is lined within the inner surface of the mold. Through polymerization a polyurethane foam forms and expands, adopting the shape of the mold. After curing the foam-forming formulation, the fender obtained is demolded. Foam-forming formulations should have the right reactivity to balance quick processing with sufficient handling time. Foam-forming formulations are usually required to have both an initial reaction time sufficient long to fill each cavity of the mold before the mold is closed, and a curing time fast enough for the foam to be demolded in no more than 60 seconds after closing of the mold. The foam thus formed is desirably a self-crushing one so that a post foam crushing step is not needed. Otherwise, a separate processing step is needed for foam crushing, which increases both production time and cost, and possibly results in aesthetic failure of the resultant fenders.

Therefore, it is desirable to provide a formulation for preparing a polyurethane foam that has a lower density than incumbent polyurethane foams, has the desirable reactivity that results in the right balance of quick processing and sufficient handling time, has sufficient adhesion to polymer films to be free from delamination when used in fenders, meet industry requirements for fenders such as hardness and surface appearance, and is self-crushing.

SUMMARY OF THE INVENTION

The present invention provides a novel formulation that has all the desired features. The formulation of the present invention comprises two different polyoxypropylene polyols. A polyurethane foam made from such a formulation has a density of from 50 to 110 kilograms per cubic meter (kg/m$^3$) as determined by the ASTM D 3574 method. Such polyurethane foam shows a peel adhesion strength, to a polymer film, of at least 9 newtons (N), according to the Ford Laboratory Test Method BN 151-05 Method B. A multilayer structure comprising such polyurethane foam attached to the polymer film is able to be demolded without any skin peeling observable to the naked eye in no more than 80 seconds at a mold temperature of from 50 to 70° C. The formulation of the present invention is particularly suitable for preparing polyurethane foams useful for automotive fenders.

In a first aspect, the present invention is a formulation for preparing a polyurethane foam comprising:

(a) a polyol composition comprising two different polyoxypropylene polyols; and (b) an isocyanate-terminated prepolymer composition, with an isocyanate content of from 10 to 48 weight percent (wt %) based on the total weight of the prepolymer composition, comprising the reaction product of (b1) diphenylmethane diisocyanate, (b2) carbodiimide-modified diphenylmethane diisocyanate, (b3) polymethylene polyphenylisocyanate, and (b4) a third polyether polyol.

In a second aspect, the present invention is a polyurethane foam comprising the reaction product of:

(a) a polyol composition comprising two different polyoxypropylene polyols; and (b) an isocyanate-terminated prepolymer composition, with an isocyanate content of from 10 to 48 wt % based on the total weight of the prepolymer composition, comprising the reaction product of (b1) diphenylmethane diisocyanate, (b2) carbodiimide-modified diphenylmethane diisocyanate, (b3) polymethylene polyphenylisocyanate, and (b4) a third polyether polyol.

In a third aspect, the present invention is a process for preparing a multilayer structure made of the polyurethane foam of the second aspect. The process comprises:

placing a polymer film into a mold;

mixing (a) a polyol composition and (b) an isocyanate-terminated prepolymer composition to form a formulation;

dispensing the formulation into the mold; and curing the formulation to form a polyurethane foam attached to the polymer film;

wherein (a) the polyol composition comprises, based on the total weight of the polyol composition, (a1) from 10 to 23 wt % of a first polyoxypropylene polyol having a functionality of from 2 to 3.8 and an equivalent weight of from 85 to 2,000, (a2) from 3 to 15 wt % of a second polyoxypropylene polyol having a functionality of from 4.5 to 8 and an equivalent weight of from 100 to 175, (a3) from 30 to 60 wt % of an ethylene oxide-capped polyether polyol having an equivalent weight of from 70 to 2,500 and an oxyethylene content of from 10 to 25 wt %, (a4) from 5 to 40 wt % of a copolymer polyol, (a5) a latent catalyst, and (a6) water; and (b) the isocyanate-terminated prepolymer composition has an isocyanate content of from 10 to 48 wt % based on the total weight of the prepolymer composition, and comprises the reaction product of (b1) diphenylmethane diisocyanate, (b2) carbodiimide-modified diphenylmethane diisocyanate, (b3) polymethylene polyphenylisocyanate, and (b4) a third polyether polyol.

DETAILED DESCRIPTION OF THE INVENTION

The formulation for preparing a polyurethane foam of the present invention comprises (a) a polyol composition, which comprises at least two different polyoxypropylene polyols. "Polyoxypropylene polyols" herein refer to polyols that are polymerized products of only propylene oxide and an initiator. The two different polyoxypropylene polyols—the first and second polyoxyproprylene polyols—have different functionalities.

The polyol composition useful in the present invention comprises one or more first polyoxypropylene polyols. The first polyoxypropylene polyols may have a functionality of from 2 to 3.8, from 2 to 3.5, or from 2 to 3. The first polyoxypropylene polyols may have an equivalent weight of 85 or more, 150 or more, 250 or more, or even 450 or more, and at the same time, 2,000 or less, 1,500 or less, 1,000 or less, or even 800 or less. Equivalent weight is the weight of a polyol per reactive site. Equivalent weight is equal to the number average molecular weight of a polyol divided by the functionality of the polyol (the combined number of hydroxyl, primary amine and secondary amine groups). Suitable commercially available first polyoxypropylene polyols include, for example, VORANOL™ 2110 and VORANOL 220-110 polyols all available from The Dow Chemical Company.

The concentration of the first polyoxypropylene polyol may be, based on the total weight of the polyol composition, 10 wt % or more, 12 wt % or more, or even 15 wt % or more, and at the same time, 23 wt % or less, 22 wt % or less, or even 20 wt % or less.

The polyol composition useful in the present invention also comprises one or more second polyoxypropylene polyols. The second polyoxypropylene polyols may have a functionality of 4.5 or more, 4.6 or more, 4.9 or more, or even 5 or more, and at the same time, 8 or less, 7.5 or less, 7 or less, or even 5.9 or less. The second polypoxypropylene polyols may have an equivalent weight of 100 or more, 120 or more, 130 or more, or even 140 or more, and at the same time, 170 or less, 160 or less, or even 155 or less.

The second polyoxypropylene polyols may be, for example, a sorbitol-initiated or sucrose-initiated polyol. Suitable commercially available second polyoxypropylene polyols include, for example, VORANOL 360, VORANOL 202, VORANOL 370, VORANOL 446, VORANOL 520 and VORANOL RN 482 polyols, all available from The Dow Chemical Company.

The concentration of the second polyoxypropylene polyol may be, based on the total weight of the polyol composition, 3 wt % or more, 3.5 wt % or more, 4 wt % or more, or even 4.5 wt % or more, and at the same time, 15 wt % or less, 12 wt % or less, 10 wt % or less, 7 wt % or less, or even 5 wt % or less.

The total concentration of the first polyoxypropylene polyol and the second polyoxypropylene polyol may be, based on the total weight of the polyol composition, 15 wt % or more, or even 17 wt % or more, and at the same time, 28 wt % or less, or even 25 wt % or less.

In some embodiments of the present invention, the polyol composition useful in the present invention further comprises one or more ethylene oxide-capped polyether polyols having an oxyethylene content of from 10 to 25 wt %, based on the total weight of the ethylene oxide-capped polyether polyols. Preparation of such ethylene oxide-capped polyether polyols is well-known in the art and generally includes polymerization of propylene oxide using a hydroxyl- or amine-containing initiator, followed by capping with ethylene oxide. The oxyethylene content of the ethylene oxide-capped polyether polyol, which herein refers to the content of polymerized ethylene oxide, may be, based on the weight of the ethylene oxide-capped polyether polyol, 12 wt % or more, or even 15 wt % or more, and at the same time, 22 wt % or less, or even 20 wt % or less.

The ethylene oxide-capped polyether polyol useful in the present invention may have a functionality of 2 or more, 2.5 or more, or even 3 or more, and at the same time, 7 or less, 6 or less, or even 4.2 or less. The ethylene oxide-capped polyether polyol may have an equivalent weight of 200 or more, 800 or more, or even 1,000 or more, and at the same time, 2,500 or less, 2,300 or less, or even 2,000 or less. Suitable commercially available ethylene oxide-capped polyether polyols include, for example, VORANOL CP 6001, VORANOL 4240 and SPECFLEX™ NC 630 polyols all available from The Dow Chemical Company.

When present, the concentration of the ethylene oxide-capped polyether polyol may be, based on the total weight of the polyol composition, 30 wt % or more, 35 wt % or more, or even 40 wt % or more, and at the same time, 60 wt % or less, 55 wt % or less, or even 50 wt % or less.

The polyol composition useful in the present invention may further comprise one or more copolymer polyols. Such copolymer polyol is usually a dispersion or a solution that contains a carrier polyol and polymer particles dispersed therein. The copolymer polyols may be produced by polymerizing one or more ethylenically unsaturated monomers dissolved or dispersed in the carrier polyol in the presence of a free radical catalyst to form a stable dispersion of polymer particles in the carrier polyol. In one embodiment of the present invention, the copolymer polyol comprises copolymers of styrene and acrylonitrile (SAN) particles. The carrier polyol in the copolymer polyol may be a polyether polyol having an equivalent weight of 500 or higher, 1,800 or higher, or even 2,200 or higher. The carrier polyol may be a diol, a triol, or mixtures thereof. Examples of suitable carrier polyols include VORANOL 4703 and VORANOL 1900 polyols both available from The Dow Chemical Company.

The copolymer polyol useful in the present invention generally has a polymer solids content of from 5 to 65 wt %, or from 22 to 50 wt %, based on the total weight of the copolymer polyol. The copolymer polyol may have an average hydroxyl (OH) number of from 15 to 40 milligrams potassium hydroxide per gram sample (mg KOH/g), or from 21 to 30 mg KOH/g, according to the ASTM D4274 method. Suitable commercially available copolymer polyols include, for example, SPECFLEX NC 701, VORALUX™ HL 400 and VORANOL 3943 polyols all available from The Dow Chemical Company.

When present, the concentration of the copolymer polyol may be, based on the total weight of the polyol composition, 5 wt % or more, 10 wt % or more, 15 wt % or more, or even 20 wt % or more, and at the same time, 40 wt % or less, 35 wt % or less, 30 wt % or less, or even 25 wt % or less.

The polyol composition useful in the present invention may also comprise a latent (delayed action) catalyst. "Latent" or "delayed action" catalyst herein refers to a catalyst that displays the desirable property of having a slow start followed by increased activity. The latent catalyst is preferably an amine catalyst. The latent catalyst may comprise at least one latent gel catalyst, at least one latent blowing catalyst, or mixtures thereof. The latent blowing catalyst may be thermally activated by the heat of the exotherm reaction of isocyanate(s) with polyol(s). The latent blowing catalysts useful in the present invention may be carboxylic acid blocked tertiary amines such as carboxylic acid blocked tertiary amine ethers. The latent gel catalyst can be used to increase the reaction rate between polyol(s) and isocyanate(s) and promote dimensional stability. The latent gel catalysts can be any tertiary amine catalysts known in the polyurethane art that have time delay properties, including alicyclic tertiary amines and aliphatic tertiary amines Examples of suitable latent gel catalysts include unblocked aliphatic gel catalysts such as N,N,N',N'-tetramethyl hexamethylene diamine and N,N'-dimethyl-N,N'-diisopropyl hexamethylenediamine; organic acid blocked aliphatic, alicyclic or heterocyclic tertiary amine catalysts such as acid blocked amines of triethylenediamine, N-ethyl or methyl morpholine, N,N-dimethylaminoethyl morpholine, N-butylmorpholine, N,N'-dimethylpiperazine, bis-(dimethylamino-alkyl)-piperazine, and 1,2-dimethylimidazole. Suitable commercially available latent catalysts include, for example, DABCO™ BL-17 catalyst based on bis(N,N-dimethylaminoethyl) ether available from Air Products Corporation, NIAX™ A-300 and NIAX A-400 tertiary amine catalysts available from Momentive Performance Materials.

When present, the concentration of the latent catalyst in the polyol composition may be, based on the total weight of the polyol composition, 0.01 wt % or more, 0.1 wt % or more, or even 0.2 wt % or more, and at the same time, 6 wt % or less, 5 wt % or less, 4 wt % or less, or even 3 wt % or less.

The polyol composition useful in the present invention may also comprise an additional catalyst that is different from the latent catalyst described above. The additional catalyst may include tertiary amine compounds, amines with isocyanate reactive groups and organometallic compounds. The additional catalyst preferably includes a tertiary amine catalyst, an organotin catalyst, or mixtures thereof. Examples of suitable tertiary amine compounds include trimethylamine, triethylamine, N-methylmorpholine, N-ethylmorpholine, N-coco-morpholine, morpholine, N,N-dimethylcyclohexylamine, pentamethyldiethylenetriamine, tetramethyl ethylenediamine, bis (dimethylaminoethyl) ether, 3-methoxy-N-dimethylpropylamine, N,N-dimethylethanolamine, N,N-dimethyl-N',N'-dimethyl isopropylpropylenediamine, N,N-diethyl-3-diethylamino-propylamine, N,N-dimethylbenzylamine, N,N-dimethylpiperazine, 1-methyl-4-dimethylaminoethyl-piperazine, 1,4-diazobicyclo[2,2,2]octane, bis(dimethylaminoethyl)ether, bis(2-dimethylaminoethyl)ether, N,N-dimorpholine diethylether, pentamethylene diamine, and mixtures thereof. Suitable commercially available amine catalysts include, for example, DABCO 33LV triethylene diamines catalyst available from Air Products, NIAX A-4 amine catalyst available from Momentive Performance Materials. Examples of suitable organotin catalysts include stannous octoate, stannous oleate, stannic chloride, dimethyltin dilaurate and dibutyltin dilaurate. Organotin catalysts are generally used in conjunction with one or more tertiary amine catalysts. Suitable commercially available organotin catalysts include, for example, DABCO T-95 catalyst (stannous octoate), and DABCO T-9 catalyst (dibutyltin dilaurate) available from Air Products.

When present, the concentration of the additional catalyst may be, based on the total weight of the polyol composition, 0.1 wt % or more, 1 wt % or more, or even 1.5 wt % or more, and at the same time, 6 wt % or less, 5 wt % or less, or even 4 wt % or less.

The polyol composition useful in the present invention may also comprise one or more polyester polyols. The polyester polyol may include reaction products of polycarboxylic acids or their anhydrides with polyhydric alcohols. The polycarboxylic acids or their anhydrides may be aliphatic, cycloaliphatic, aromatic and/or heterocyclic. Examples of suitable polycarboxylic acids include oxalic acid, malonic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, 1,4-cyclohexane-dicarboxylic acid, or mixtures thereof. Examples of suitable polyhydric alcohols include ethylene glycol; 1,3-propylene glycol; 1,2-propylene glycol; 1,4-butylene glycol; 1,3-butylene glycol; 1,2-butylene glycol; 1,5-pentane diol; 1,4-pentane diol; 1,3-pentane diol; 1,6-hexane diol; 1,8-octane diol; neopentyl glycol; cyclohexane dimethanol; 1,7-heptane diol; glycerol; 1,1,1-trimethylolpropane; 1,1,1-trimethylolethane; hexane-1,2,6-triol; α-methyl glucoside; pentaerythritol; quinitol; mannitol; sorbitol; sucrose; methyl glycoside; diethylene glycol; triethylene glycol; tetraethylene glycol; dipropylene glycol; dibutylene glycol; or mixtures thereof. When used, the concentration of the polyester polyol may be, based on the total weight of the polyol composition, 0.1 wt % or more, 0.5 wt % or more, or even 0.8 wt % or more, and at the same time, 10 wt % or less, 5 wt % or less, or even 4 wt % or less.

The polyol composition useful in the present invention may have a total average OH number of 80 mg KOH/g or more, 85 mg KOH/g or more, or even 90 mg KOH/g or more, and at the same time, 110 mg KOH/g or less, 105 mg KOH/g or less, or even 101 mg KOH/g or less, according to the ASTM D 4274 method.

The polyol composition useful in the present invention may further include a blowing agent. Preferably, the blowing agent is water. The concentration of water may be, based on the total weight of the polyol composition, 1 wt % or more, 2 wt % or more, 2.5 wt % or more, or even 3 wt % or more, and at the same time, 5 wt % or less, 4.5 wt % or less, 4 wt % or less, or even 3.5 wt % or less, as measured by the ASTM D 4672 method.

In some embodiments of the present invention, the polyol composition useful in the present invention comprises, based on the total weight of the polyol composition, (a1) from 10 to 23 wt % of the first polyoxypropylene polyol, (a2) from 3 to 15 wt % of the second polyoxypropylene polyol, (a3) from 30 to 60 wt % of an ethylene oxide-capped polyether polyol having an equivalent weight of from 70 to 2500 and an oxyethylene content of from 10 to 25 wt %, (a4) from 5 to 40 wt % of a copolymer polyol, (a5) the latent catalyst, and (a6) water. In some preferred embodiments, the polyol composition comprises, based on the total weight of the polyol composition, (a1) from 15 to 20 wt % of the first polyoxypropylene polyol, (a2) from 4.5 to 10 wt % of the second polyoxypropylene polyol, (a3) from 35 to 55 wt % of the ethylene oxide-capped polyether polyol, (a4) from 10 to 35 wt % of the copolymer polyol, (a5) the latent catalyst, and (a6) water.

The polyol composition useful in the present invention may also comprise one or more surfactants. The surfactants may be silicon-based compounds. Examples of suitable surfactants include silicone oils; organosilicone-polyether copolymers such as polydimethyl siloxane, polyether modified polydimethyl siloxane, polydimethylsiloxane-polyoxyalkylene block copolymers; or mixtures thereof. Preferably, organosilicone surfactants are used. Suitable commercially available organosilicone surfactants include, for example, TEGOSTAB™ B 8462, TEGOSTAB B 8404, TEGOSTAB B 8871 and TEGOSTAB B 8715LF surfactants, all available from Evonik Industries; DABCO DC 198 and DABCO DC 5043 surfactants both available from Air Products; NIAX L-627 and NIAX L-618 surfactants both available from Momentive Performance Materials; or mixtures thereof. The surfactants are generally used in an amount of from 0.01 to 7 wt %, or from 0.1 to 6 wt %, based on the total weight of the polyol composition.

The polyol composition useful in the present invention may further include one or more chain extenders and/or crosslinkers. The crosslinkers may have at least three isocyanate-reactive groups per molecule and an equivalent weight per isocyanate-reactive group of less than 400. Examples of suitable crosslinkers include diethanol amine, monoethanol amine, triethanol amine, mono-, di-, or tri-(isopropanol) amine, glycerine, trimethylol propane, pentaerythritol, and sorbitol. When present, the amount of the crosslinkers, based on the total weight of the polyol composition, is generally 0.1 wt % or more, or even 0.5 wt % or more, and at the same time, is generally 10 wt % or less, or even 3 wt % or less. The chain extender may have two isocyanate-reactive groups per molecule and an equivalent weight per isocyanate-reactive group of less than 400. Examples of suitable chain extenders include ethylene glycol; diethylene glycol; 1,2-propylene glycol; dipropylene glycol; tripropylene glycol; ethylene diamine; phenylene diamine; bis(3-chloro-4-aminophenyl)methane and 2,4-diamino-3,5-diethyl toluene. When present, the chain extenders are typically used in an amount of from 1 to 50 wt %, or from 3 to 25 wt %, based on the total weight of the polyol composition.

The formulation of the present invention also comprises an isocyanate-terminated prepolymer composition, which comprises the reaction product of (b1) diphenylmethane diisocyanate (MDI), (b2) carbodiimide-modified MDI, (b3) polymethylene polyphenylisocyanate, and (b4) a third polyether polyol.

The isocyanate-terminated prepolymer composition useful in the present invention may be the reaction product of the third polyether polyol with a stoichiometric excess of the mixture of isocyanates, so as to provide the prepolymer composition with an isocyanate content of from 10 to 48 wt %, based on the weight of the isocyanate-terminated prepolymer composition. The isocyanate (NCO) content herein is measured according to the ASTM D 445 method. The NCO content of the isocyanate-terminated prepolymer composition may be, based on the total weight of the isocyanate-terminated prepolymer composition, 15 wt % or more, or even 20 wt % or more, and at the same time, may be 35 wt % or less, 30 wt % or less, or even 27 wt % or less.

MDI used to prepare the isocyanate-terminated prepolymer composition may be 4,4'-, 2,4'- or 2,2'-diphenylmethane diisocyanate, or mixtures thereof. A mixture of 2,4'-diphenylmethane diisocyanate and 4,4'-diphenylmethane diisocyanate may be used. The total concentration of MDI, based on the total weight of the prepolymer composition, is generally 25 wt % or more, or even 28 wt % or more, and at the same time, is generally 45 wt % or less, or even 42 wt % or less.

The carbodiimide-modified MDI used to prepare the isocyanate-terminated prepolymer composition may comprise one or more carbodiimide-modified isomers of MDI described above. The concentration of the carbodiimide-modified MDI used to prepare the isocyanate-terminated prepolymer composition may be, based on the total weight of the prepolymer composition, 15 wt % or more, 17 wt % or more, or even 19 wt % or more, and at the same time, 35 wt % or less, 32 wt % or less, or even 30 wt % or less.

The polymethylene polyphenylisocyanate used to prepare the isocyanate-terminated prepolymer composition may have an average isocyanate functionality of 2 or more, 2.2 or more, or even 2.3 or more, and at the same time, 3 or less, 2.8 or less, or even 2.7 or less. The polymethylene polyphenylisocyanate may have a number average molecular weight of 250 or more, 270 or more, or even 290 or more, and at the same time, 400 or less, 380 or less, or even 360 or less. Suitable commercially available polymethylene polyphenylisocyanates include PAPI™ PB-219, PAPI 27, VORANATE™ M229, VORANATE 220, VORANATE 290, VORANATE M595 and VORANATE M600 isocyanates, all available from The Dow Chemical Company.

The concentration of the polymethylene polyphenylisocyanate used to prepare the isocyanate-terminated prepolymer composition may be, based on the total weight of the prepolymer composition, 5 wt % or more, 10 wt % or more, or even 15 wt % or more, and at the same time, 30 wt % or less, 25 wt % or less, or even 23 wt % or less.

The third polyether polyol used to prepare the isocyanate-terminated prepolymer composition may be any polyether polyols known in the art. The third polyether polyol may comprise one or more copolymers of propylene oxides and ethylene oxides. The third polyether polyol may have an oxyethylene content of 40 wt % or more, 45 wt % or more, or even 50 wt % or more, and at the same time, 77 wt % or less, 70 wt % or less, or even 65 wt % or less, based on the total weight of the third polyether polyol. The third polyether polyol may have a functionality of 2 or more, 2.6 or more, or even 3 or more, and at the same time, 4.2 or less, 4 or less, or even 3.8 or less. The third polyether polyol may have an equivalent weight of 800 or more, 1,000 or more, or even 1,650 or more, and at the same time, 3,000 or less, 2,800 or less, or even 2,600 or less. The third polyether polyol may have a primary OH content of 40% or more, or even 50% or more, and at the same time, 80% or less, or even 70% or less, based on the total OH content of the third polyether polyol.

The concentration of the third polyether polyol used to prepare the isocyanate-terminated prepolymer composition may be, based on the total weight of the prepolymer composition, 5 wt % or more, 10 wt % or more, or even 15 wt % or more, and at the same time, 30 wt % or less, 25 wt % or less, or even 20 wt % or less.

Suitable commercially available isocyanate-terminated prepolymers include, for example, SPECFLEX NE 136 and SPECFLEX NE 141 prepolymers available from The Dow Chemical Company.

The isocyanates (b1), (b2) and (b3) and the third polyether polyol (b4) described above may react in any conditions known in the art to prepare the prepolymer composition. This reaction to form the prepolymer may be conducted in the presence of a catalyst. The catalyst herein can be the above described additional catalyst in the polyol composition. The reaction may be conducted at from 20 to 100° C., and may take from 1 to 6 hours to complete.

The isocyanate-terminated prepolymer composition useful in the present invention may be present, per 100 weight parts of the polyol composition, in an amount of 52 weight parts or more, 60 weight parts or more, or even 70 weight parts or more, and at the same time, 95 weight parts or less, 90 weight parts or less, or even 85 weight parts or less.

The formulation of the present invention may further comprise any one or combination of the following additives: pigments and colorants, flame retardants, antioxidants, surface modifiers, bioretardant agents, odor masks, antioxidants, ultraviolet (UV) stabilizers, antistatic agents and viscosity modifiers.

The formulation of the present invention may have a cream time of from 20 to 29 seconds. The formulation of the present invention may have a gel time of from 55 to 95 seconds, or from 70 to 94 seconds. The time period between the rise time and tack-free time of the formulation of the present invention may be at least 650 seconds, or at least 670 seconds. The cream time, gel time, rise time and tack-free time herein are measured by the hand-mixing test method described in the Examples below.

The polyurethane foam of the present invention comprises the reaction product of the polyol composition described above, the isocyanate-terminated prepolymer composition described above, and in some embodiments, other optional components described above.

The polyurethane foam of the present invention may be prepared by combining (a) the polyol composition described above, (b) the isocyanate-terminated prepolymer composition described above, and in some embodiments, other optional components described above. Components in the formulation of the present invention may be mixed together in any convenient manner, for example, by using a spray apparatus, a mix head with or without a static mixer, or a vessel. In general, polyols are combined with water, the latent catalyst and optional components to form a "B" side, and "B" side is then contacted with the isocyanate-terminated prepolymer composition ("A" side) in order to begin the polymerization reaction and foaming All components in the formulation of the present invention may be combined and introduced into a mold or cavity in any way known in the art to produce polyurethane foams. In one embodiment of the present invention, the polyurethane foam is prepared by using a mixing injection head, wherein the two "sides" of the formulation are combined and mixed and then injected into the mold or cavity to be filled. So-called "one-shot" injection, wherein the mold or cavity is filled from a single injection point while simultaneously drawing a vacuum from another point, is particularly desirable. A high pressure process may be used in preparing the polyurethane foam of the present invention.

In one embodiment, the polyurethane foam of the present invention is a molded polyurethane foam. The molded polyurethane foam can be made by transferring the formulation of the present invention to a closed mold where the foaming reaction takes place to produce a shaped foam. A "hot-molding" process, in which the mold is heated to drive the curing of the formulation of the present invention, may be used. The polyurethane foam of the present invention does not form voids upon demolding, and is free of surface defects observable by the naked eye. After demolding, the obtained polyurethane foam does not require a post production foam crushing step.

In some embodiments, the polyurethane foam of the present invention has a density of 50 kilograms per cubic meter ($kg/m^3$) or more, 55 $kg/m^3$ or more, 60 $kg/m^3$ or more, or even 65 $kg/m^3$ or more, as measured by the ASTM D 3574 method. "Density" herein refers to the molded density of the polyurethane foam. At the same time, the density of the polyurethane foam may be 110 $kg/m^3$ or less, 105 $kg/m^3$ or less, 100 $kg/m^3$ or less, or even 95 $kg/m^3$ or less.

The polyurethane foam of the present invention has desirable hardness as evidenced by a compression force deflection (CFD) value of from 2 to 12 kilopascals (KPa) according to the ASTM D 3574 method. The CFD value of the polyurethane foam may be 4 KPa or more, 5 KPa or more, or even 6 KPa or more, and at the same time, 10 KPa or less, or even 8 KPa or less.

The polyurethane foam of the present invention is a self-crushing foam. "Self-crushing foam" refers to a foam that does not require a post production foam crushing step.

The polyurethane foam of the present invention is suitable to form a multilayer structure which comprises the polyurethane foam coated on a substrate. The substrate can be paper, metal, plastics, wood-board or other commonly used substrates. The multilayer structure may be laminated. The multilayer structure of the present invention is useful in automotive vehicles (for example, automobiles, trucks and tractors) applications, such as bodies (frames), hoods, doors, fenders, instrument panels, mirror housings, bumpers, and trims for automotive vehicles.

In some embodiments of the present invention, the multilayer structure of the present invention comprises two layers of polymer films and the polyurethane foam described above residing in between. The polyurethane foam may be directly attached to the polymer films. Particularly suitable polymer films include polyurethane films, polyethylene films, or combinations thereof. Such multilayer structure has a peel adhesion strength of at least 9 N as determined by the Ford Laboratory Test Method BN 151-05 Method B. Generally the thickness of the polymer films may be from 10 to 60 microns, from 15 to 55 microns, or from 20 to 50 microns. The thickness of the polyurethane foam layer may be generally from 30 to 70 millimeters (mm), from 35 to 65 mm, or from 40 to 60 mm The thickness of the multilayer structure may be generally from 30 to 70 mm, from 35 to 65 mm, or from 40 to 60 mm In one embodiment, the process for preparing a multilayer structure made of the polyurethane foam described above comprises the following: placing a polymer film into a mold; mixing (a) the polyol composition described above, (b) the isocyanate-terminated prepolymer composition described above, and optionally additives described above to form the formulation of the present invention; dispensing the formulation into the mold; and curing the formulation to form a polyurethane foam attached to the polymer film. In one embodiment of the present invention, two pieces of the polymer films are placed, optionally under vacuum, into the upper part and the lower part of the mold, respectively. In some preferred embodiments, polyethylene films and polyurethane films are used. Before placing the polymer film, the mold may be heated to a temperature of from 50 to 70° C., or from 55 to 65° C. The process may further comprise the step of demolding the obtained multilayer structure from the mold. The multilayer structure is able to be demolded in no more than 80 seconds after dispensing the formulation into the mold when the mold temperatures are maintained at from 50 to 70° C., or from 55 to 65° C. The multilayer structure may be demolded in 75 seconds or less. The process of the present invention is free of a post foam crushing step. The multilayer structure obtained is free, or substantially free, of surface defects observable by the naked eye, and meets the aesthetic requirement in the automotive industry.

EXAMPLES

Some embodiments of the invention will now be described in the following Examples, wherein all parts and percentages are by weight unless otherwise specified. The following materials are used in the examples:

DABCO KTM60 catalyst is a non-acid blocked, controlled-activity tertiary amine available from Air Products.

TOYOCAT™ D 60 catalyst is a surface cure amine catalyst available from Tosoh. DABCO DC-1 catalyst, available from Air Products, is a blend of delayed action tin and amine catalysts.

DABCO T-12 catalyst is dibutyltin dilaurate catalyst available from Air Products.

DABCO 33 LV catalyst is a tertiary amine catalyst available from Air Products.

NIAX A-4 catalyst, available from Momentive Performance Materials, is an amine catalyst blend for promoting water/isocyanate reaction.

NIAX A-300 catalyst is a tertiary amine delayed action catalyst available from Momentive Performance Materials.

Formic acid is available from Quimica Industrial Olympus.

Glycerine is available from Pochteca Materias Primas.

SPECFLEX NC 701 copolymer polyol, available from The Dow Chemical Company, is a grafted polyether polyol containing copolymerized styrene and acrylonitrile, and having around 40 wt % solids and an OH number of around 22 mg KOH/g.

VORANOL CP 6001 polyol, available from The Dow Chemical Company, is a glycerol-initiated ethylene oxide-capped polyoxypropylene polyol with a functionality of 3, an equivalent weight of 2,040, and an oxyethylene content of around 15 wt %.

VORANOL 4240 polyol, available from The Dow Chemical Company, is an ethylene oxide-capped polyoxypropylene polyol with a functionality of 2, and an average molecular weight of 4,000.

SPECFLEX NC 630 polyol, available from The Dow Chemical Company, is an ethylene oxide-capped polyether polyol with a functionality of 4.2, an equivalent weight of 1,810, and an oxyethylene content of 15.5 wt %.

DIEXTER™ G 156 T-63 polyol, available from Coim, is a polyester polyol having an equivalent weight of 890 and an OH number of 63 mg KOH/g.

VORANOL 2110 polyol, available from The Dow Chemical Company, is a polyoxypropylene polyol with a functionality of 2, an equivalent weight of 510, and an OH number of 110 mg KOH/g.

VORANOL 370 polyol, available from The Dow Chemical Company, is a polyoxypropylene polyol with a functionality of 6.9, an equivalent weight of 152, and an OH number of 369 mg KOH/g.

TEGOSTAB B 8715 surfactant is a silicon-based surfactant available from Evonik Industries.

PAPI 94 isocyanate, available from The Dow Chemical Company, is a polymethylene polyphenylisocyanate that contains MDI, and has a functionality of approximately 2.3, an isocyanate equivalent weight of approximately 131, and a NCO content of about 32 wt %.

Isocyanate 1 is SPECFLEX NE 170 isocyanate available from The Dow Chemical Company. It is a blend of polymethylene polyphenylisocyanate and an isocyanate-terminated prepolymer comprising the reaction product of diphenylmethane diisocyanate with glycol, that has a NCO content of from 27.6 to 29.2 wt %.

Isocyanate 2 is SPECFLEX NE 396 isocyanate available from The Dow Chemical Company. It is an isocyanate-terminated prepolymer having a NCO content of from 30.1 to 31.6 wt %, that comprises the reaction product of a polyether polyol with an isocyanate mixture containing MDI, and polymethylene polyphenylisocyanate.

Isocyanate 3 is VORALUX HE 134 isocyanate available from The Dow Chemical Company. It is an isocyanate-terminated prepolymer having a NCO content of from 29.4 to 30.2 wt %, that comprises the reaction product of a polyether polyol with an isocyanate mixture containing MDI, and polymethylene polyphenylisocyanate.

Isocyanate 4 is SPECFLEX NE 136 isocyanate available from The Dow Chemical Company. It is an isocyanate-terminated prepolymer having a NCO content of from 25 to 27 wt %, that comprises the reaction product of about 16.8 wt % of a polyether polyol having a functionality of 3, an equivalent weight of 2568 and an oxyethylene content of from 61 to 65 wt % with an isocyanate mixture containing about 36.8 wt % of methylene diphenyl diisocyanate, about 23.2 wt % of carbodiimide-modified methylene diphenyl diisocyanate and about 23.2 wt % of polymethylene polyphenylisocyanate, based on the total weight of the prepolymer composition.

The following standard analytical equipment and methods are used in the Examples.

Hydroxyl (OH) Number

The OH number of a polyol is measured according to the ASTM D4274 method.

Isocyanate (NCO) Content

The isocyanate (NCO) content of an isocyanate compound is measured according to the ASTM D 445 method.

Peel Adhesion Strength Test

The peel adhesion strength of a multilayer structure is measured according to the Ford Laboratory Test Method BN 151-05 Method B. If the multilayer structure has a peel adhesion strength of 9 N or more, the multilayer structure passes the peel adhesion strength test. If the peel adhesion strength is less than 9 N, the multilayer structure fails the peel adhesion strength test.

At least three specimens are used for the test. The specimen has a width of 50 mm, and a length sufficient to enable 100 mm minimum of delamination. The peel adhesion strength test is conducted using a tensile testing machine as follows:

1. Separate the face material from the foam. Proceed as the following steps (1)-(4). Retain each specimen after the adhesion strength has been determined face to foam.

(1) Manually separate the face material (coating or laminate) from the backing material along the width of each test specimen for a distance of approximately 40 mm in the direction of the specimen length. This may be assisted when necessary by the use of a suitable solvent.

(2) Set the pulling clamp at a distance of 25 mm from the opposing clamp of the tensile testing machine. Secure the separated face material in the stationary clamp and the backing material in the pulling clamp such that the longitudinal axis of the specimen forms a right angle with the closed jaws of the clamps. The method of clamping should ensure no slippage or material damage. Flat faced clamps hydraulically closed have been found satisfactory.

(3) Start the machine and separate the specimen at a rate of 125 mm/minute ensuring that data is obtained for at least 100 mm separation distance. Measurement may be made by chart recorder or interfaced computer.

(4) Ignore data for the first and last 10% of traverse and determine the average value of peaks and troughs.

2. Manually separate the backing material from the foam at the opposite end of the test specimen separated for the face material. Secure the separated backing material in the stationary clamp and the separated foam and face material in the pulling clamp. Proceed as the above steps (1)-(4).

3. Examine both sides of the foam on the test specimens after testing for the adhesion strength. Determine whether the foam portion ruptured during delamination allowing some foam to adhere to either surface. If this has occurred make the notation "foam tear" for that test specimen for the side or sides where "foam tear" occurred. If "foam tear" occurs on only one side of one test specimen, disregard this result and report the average adhesion strength for that side of the remaining two specimens. If "foam tear" occurs on the same side of two or three specimens, report the adhesion strength for that side as foam tear.

4. If it is impossible to separate manually the foam from either the face or the backing material without rupturing the foam, report the adhesion strength for the side or sides where this occurs as "foam tear".

Compression Force Deflection (CFD)

A polyol composition and an isocyanate component (total weight: 740 grams) are mixed in a high-pressure machine (Pressure: 14 MPa), then are poured into an 11 liter mold at 60° C. Three minutes later, the resultant foam is demolded and placed at room temperature for about 24 hours before testing. The CFD value of the foam is measured according to the ASTM D 3574-03 method. This test consists of measuring the force necessary to produce a 50% compression over the entire top area of the foam specimen.

Reactivity Measurement (1) Reactivity Measured by Hand-mix Experiments

A polyol composition and an isocyanate component (total weight: 80 grams)are mixed in one liter vessel for 10 seconds at room temperature (22 to 25° C.) using a jiffy type mixer at 3500 revolutions per minute (rpm). Once all the components are mixed, the reactivity of the resultant mixture is determined.

(2) Reactivity Measured by High-pressure Machine Experiments

A polyol composition and an isocyanate component (total weight: 80 grams) are mixed in a Krauss Maffei high-pressure machine (Pressure: 11-18 MPa, Temperature: 30° C.), then are poured into a one liter vessel at room temperature to determine the reactivity of the resultant mixture.

Cream time is measured by the period from the start of mixing the polyol composition and the isocyanate component till the foam begins to rise.

Gel time is measured by the period from the start of mixing the polyol composition and the isocyanate component till long strings of materials can be pulled away after inserting a steel needle or a tongue depressor into 1-2 centimeter depth of the foam.

Top of cup time is measured by the period from the start of mixing the polyol composition and the isocyanate component till the resultant mixture reaches the top edge of the vessel.

Rise time is measured by the period from the start of mixing the polyol composition and the isocyanate component till the foam stops rising.

Tack-free time is measured by the period from the start of mixing the polyol composition and the isocyanate component till the foam is no longer tacky to the touch.

Example (Ex) 1 and Comparative Examples (Comp Exs) A-D

A 4.95 liter cylinder mold was used to measure self-crushing properties of foams made from formulations of Ex 1 and Comp Exs A-D given in Table 1. The mold was adapted to measure the mold pressure and had a valve in the lower part of the mold. The valve could be opened to release pressure before opening the mold. The mold was heated and maintained at 60° C. The polyol composition and the isocyanate component of each formulation (total weight: 331 grams) were hand-mixed at 25° C. for 10 seconds using a jiffy type mixer at 3500 rpm. The resultant mixture was then poured into the mold for performance tests.

Maximum pressure was the mold pressure at 4 minutes after mixing the polyol composition and the isocyanate component.

Minimum pressure was determined as follows: After 4 minutes after mixing the polyol composition and the isocyanate component, the valve in the lower part of the mold was opened. One minute later, the mold pressure was measured and defined as the minimum pressure. A self-crushing foam is expected to have a minimum pressure of 0.

The above properties are shown in Table 2. Foams made from formulations of Comp Exs A-C were closed foams. The foam made from the formulation of Comp Ex D collapsed. The foam made from the formulation of Ex 1 showed a minimum pressure (5 minutes) of 0. It indicates that the foam made from the formulation of the present invention is a self-crushing foam.

TABLE 1

| | Comp Ex A | Comp Ex B | Comp Ex C | Comp Ex D | Ex 1 |
|---|---|---|---|---|---|
| Polyol Composition, wt % relative to the total weight of the polyol composition | | | | | |
| DABCO KTM60 | 0.5 | 0 | 0 | 0 | 0 |
| DABCO DC-1 | 0.5 | 0 | 0 | 0 | 0 |
| NIAX A-4 | 0 | 2.4 | 2.4 | 2.4 | 2.38 |
| NIAX A-300 | 0 | 0.5 | 0.5 | 0.5 | 0.48 |
| Glycerine | 0 | 2 | 2 | 2 | 1.9 |
| SPECFLEX NC 701 copolymer polyol | 30 | 24 | 24 | 24 | 22.86 |
| VORANOL CP 6001 polyol | 66.8 | 44.3 | 44.3 | 44.3 | 43.9 |
| DIEXTER G156 T-63 | 0 | 1 | 1 | 1 | 0.95 |
| VORANOL 2110 polyol | 0 | 20 | 20 | 20 | 19.05 |
| VARANOL 370 polyol | 0 | 0 | 0 | 0 | 4.76 |
| TEGOSTAB B 8715 surfactant | 0.4 | 0.4 | 0.4 | 0.4 | 0.48 |
| Water | 1.8 | 3.4 | 3.4 | 3.4 | 3.24 |
| Isocyanate Component | | | | | |
| Isocyanate Type | | | | | |
| | PAPI 94 | Isocyanate 1 | Isocyanate 2 | Isocyanate 3 | Isocyanate 4 |
| Weight Parts* | 44 | 67 | 67 | 67 | 64 |

*Weight parts per 100 weight parts of the polyol composition.

TABLE 2

| | Comp Ex A | Comp Ex B | Comp Ex C | Comp Ex D | Ex 1 |
|---|---|---|---|---|---|
| Maximum Pressure, Kg/cm² (4 minutes) | — | 1.40 | 1.7 | 1.5 | 1.35 |
| Minimum pressure, kg/cm² (5 minutes) | — | 1.35 | 1.55 | 1.35 | 0 |
| Foam | Closed foam | Closed foam | Closed foam | Foam collapsed | Self-crushing foam |

Example (Ex) 2 and Comp Exs E-J

Ex 2 was prepared by means of hand-mix experiments based on the same formulation as Ex 1 given in Table 1. Comp Exs E-J were prepared by means of hand-mix experiments based on formulations shown in Table 3. Reactivity of the above formulations measured by the hand-mix test method described above is shown in Table 4.

The polyurethane foam made from the formulation of Comp Ex E had cavities on the foam surface. The reaction time for the formulation of Comp Ex F was too short to allow sufficient handling time. The reaction time for the formulation of Comp Ex G was too long to be acceptable. The foam made from the formulation of Comp Ex I collapsed. Formulations of Comp Exs H and J, and Ex 2 all showed desirable reaction time.

The hardness of the foam made from the formulation of Ex 2 was also determined according to the test method described above. Such foam had a satisfactory hardness with a CFD value of 6-8 KPa.

cavity, the mold was closed. After 60 seconds, the resultant multilayer structure was demolded. The density of the foam in the multilayer structure was measured according to the ASTM D 3574 method.

Properties of the formulations, the foams and multilayer structures obtained are shown in Table 5. The formulation of Comp Ex H was able to fill four cavities of the mold. However, the foam made from such formulation was easily peeled off the polyurethane films by hand (Comp Multilayer Structure A). It indicates the foam made from the formulation of Comp Ex H had very poor adhesion to the polyurethane films.

TABLE 3

|  | Comp Ex E | Comp Ex F | Comp Ex G | Comp Ex H | Comp Ex I | Comp Ex J |
|---|---|---|---|---|---|---|
| Polyol Composition, wt % relative to the total weight of the polyol composition ||||||| 
| DABCO KTM60 | 0.9 | 0.7 | 0.4 | 0.6 | 0 | 0 |
| TOYOCAT D 60 | 0.55 | 0 | 0 | 0 | 0 | 0 |
| DABCO DC-1 | 0.12 | 0 | 0 | 0 | 0 | 0 |
| DABCO T-12 | 0 | 0.013 | 0.013 | 0.013 | 0 | 0 |
| DABCO 33 LV | 0 | 0 | 0.3 | 0 | 0 | 0 |
| NIAX A-4 | 0 | 0 | 0 | 0 | 2.4 | 2.4 |
| NIAX A-300 | 0 | 0 | 0 | 0 | 2.5 | 2.5 |
| Formic acid | 0 | 0 | 0.1 | 0.1 | 0 | 0 |
| Glycerine | 6 | 2 | 2 | 2 | 2 | 2 |
| SPECFLEX NC 701 copolymer polyol | 32 | 34.26 | 15 | 32 | 24 | 24 |
| VORANOL CP 6001 polyol | 56.83 | 58.627 | 0 | 61.687 | 39.3 | 44.3 |
| VORANOL 4240 polyol | 0 | 0 | 54.787 | 0 | 0 | 0 |
| SPECFLEX NC 630 polyol | 0 | 0 | 23 | 0 | 0 | 0 |
| DIEXTER G-156T-63 | 0 | 1 | 1 | 0 | 1 | 1 |
| VORANOL 2110 polyol | 0 | 0 | 0 | 0 | 25 | 20 |
| VORANOL 370 polyol | 0 | 0 | 0 | 0 | 0 | 0 |
| TEGOSTAB B 8715 | 0.4 | 0.4 | 0.4 | 0.4 | 0.4 | 0.4 |
| Water | 3.2 | 3 | 3 | 3.2 | 3.4 | 3.4 |
| Isocyanate Component, weight parts per 100 weight parts of the polyol composition |||||||
| Isocyanate 4 | 64 | 61 | 61 | 64 | 67 | 67 |

TABLE 4

|  | Comp Ex E | Comp Ex F | Comp Ex G | Comp Ex H | Comp Ex I** | Comp Ex J | Ex 2 |
|---|---|---|---|---|---|---|---|
| Cream Time*, second | 39 | 11 | 50 | 22 | N/A | 18 | 24 |
| Gel Time*, second | 62 | 36 | 140 | 60 | N/A | 56 | 76 |
| Top of Cup Time*, second | 68 | 25 | 170 | 72 | N/A | 60 | 60 |
| Rise Time*, second | 95 | 47 | N/A | 110 | N/A | 94 | 108 |
| Tack-free Time*, second | — | — | — | — | N/A | 560 | 780 |

*Reaction times were measured by hand-mixing approach.
**The foam obtained collapsed.

Multilayer Structure 1 and Comp Multilayer Structures A and B

Multilayer Structure 1 and Comp Multilayer Structures A and B were prepared based on formulations shown in Table 5.

A two-part, 1.22 liter mold with four cavities was heated and maintained at 60° C. One piece of polyurethane film (thickness: 0.001 inches (25 microns)) was then placed in the lower part of the mold using a vacuum system. Another piece of polyurethane film was manually placed in the upper part of the mold. The polyol composition and the isocyanate component of each formulation (total weight: 82 grams) were mixed in a Krauss Maffei high-pressure machine, then injected into the cavities of the mold maintained at 60° C. After 20 seconds since the mixture was injected into the first The formulation of Comp Ex J was able to fill four cavities of the mold. However, the Comp Multilayer Structure B made from such formulation showed a peel adhesion strength of less than 9 N according to the Ford Laboratory Test Method BN 151-05 Method B, thus failed the peel adhesion strength test.

Reactivity of the formulation of Ex 1 measured by the high-pressure machine test method described above is shown in Table 5. This formulation showed desirable reactivity that was able to fill four cavities of the mold. The foam made from the formulation of Ex 1 had a molded density of 55 kg/m$^3$. The Multilayer Structure 1 comprising such foam was able to be demolded in 80 seconds, and was free of surface defects observable by the naked eye. The Multilayer Structure 1 met the peel adhesion strength requirement of 9

N according to the Ford Laboratory Test Method BN 151-05 Method B. It indicates that the foam made from the inventive formulation had sufficient adhesion to the polyurethane films.

Multilayer Structure 2

Multilayer Structure 2 was prepared based on the formulation of Ex 1 given in Table 1. A two-part, 4.95 liter mold was heated and maintained at 60° C. One piece of polyethylene film (thickness: 40 microns) was then placed in the upper part of the mold. The polyol composition and the isocyanate component of the formulation (total weight: 272 grams) were mixed in an OMS high-pressure machine, then injected into the mold maintained at 60° C. After 20 seconds since the mixture was injected into the mold, the mold was closed. After 60 seconds, the resultant multilayer structure was demolded. The density of the foam in the Multilayer Structure 2 was measured according to the ASTM D 3574 method.

Properties of the foam and Multilayer Structure 2 obtained are shown in Table 5. The formulation of Ex 1 showed desirable reactivity that was able to fill the mold. The foam made from the formulation of Ex 1 had a molded density of 55 kg/m$^3$. The Multilayer Structure 2 comprising such foam was able to be demolded in 80 seconds, and was free of surface defects observable by the naked eye. The Multilayer Structure 2 achieved a peel adhesion strength of 12 N, which met the peel adhesion strength requirement of 9 N according to the Ford Laboratory Test Method BN 151-05 Method B. It indicates that the foam made from the inventive formulation had sufficient adhesion to the polyethylene film.

TABLE 5

| | Comp Multi-layer Structure A | Comp Multi-layer Structure B | Multi-layer Structure 1 | Multi-layer Structure 2 |
|---|---|---|---|---|
| Formulation for preparing foams | Comp Ex H | Comp Ex J | Ex 1 | Ex 1 |
| Cream Time*, second | — | — | 5 | 5 |
| Gel Time*, second | — | — | 15 | 15 |
| Top of Cup Time*, second | — | — | 35 | 35 |
| Rise Time*, second | — | — | 43 | 43 |
| Tack-free Time*, second | — | — | 360 | 360 |
| Molded Foam Density, kg/m$^3$ | | | 55 | 55 |
| Peel Adhesion Strength Test | Fail | Fail | Pass | Pass |

*Reaction times were measured by high-pressure machine approach.

The invention claimed is:

1. A formulation for preparing a polyurethane foam comprising:
   (a) a polyol composition comprising:
      (a1) from 10 to 23 wt % of a first polyoxypropylene polyol having a functionality of from 2 to 3.8 and an equivalent weight of from 85 to 2000;
      (a2) from 3 to 15 wt % of a second polyoxypropylene polyol having a functionality of from 4.5 to 8 and an equivalent weight of from 100 to 175;
      (a3) from 30 to 60 wt % of an ethylene oxide-capped polyether polyol having an equivalent weight of from 70 to 2500 and an oxyethylene content of from 10 to 25 wt %;
      (a4) from 5 to 40 wt % of a copolymer polyol;
      (a5) a latent catalyst; and
      (a6) water; and
   (b) an isocyanate-terminated prepolymer composition, with an isocyanate content of from 10 to 48 wt % based on the total weight of the prepolymer composition, comprising the reaction product of (b1) diphenylmethane diisocyanate, (b2) carbodiimide-modified diphenylmethane diisocyanate, (b3) polymethylene polyphenylisocyanate, and (b4) a third polyether polyol.

2. The formulation of claim 1, wherein the polyol composition comprises (a1) from 15 to 20 wt % of the first polyoxypropylene polyol, (a2) from 4.5 to 10 wt % of the second polyoxypropylene polyol, (a3) from 35 to 55 wt % of the ethylene oxide-capped polyether polyol, and (a4) from 10 to 35 wt % of the copolymer polyol.

3. The formulation of claim 1, wherein the first polyoxypropylene polyol has a functionality of from 2 to 3.5 and an equivalent weight of from 450 to 1500.

4. The formulation of any one of claim 1, wherein the second polyoxypropylene polyol has a functionality of from 4.9 to 7 and an equivalent weight of from 100 to 160.

5. The formulation of claim 1, wherein the total concentration of the first polyoxypropylene polyol and the second polyoxypropylene polyol is from 15 to 28 wt %, based on the total weight of the polyol composition.

6. The formulation of claim 1, wherein the latent catalyst is an amine catalyst.

7. The formulation of claim 1, wherein the polyol composition has a total average hydroxyl number of from 80 to 110 milligrams potassium hydroxide per gram.

8. The formulation of claim 1, wherein the isocyanate-terminated prepolymer composition comprises the reaction product of, based on the total weight of the prepolymer composition,
   (b1) from 25 to 45 wt % of diphenylmethane diisocyanate;
   (b2) from 15 to 35 wt % of carbodiimide-modified diphenylmethane diisocyanate;
   (b3) from 5 to 30 wt % of polymethylene polyphenylisocyanate;
   (b4) from 10 to 25 wt % of the third polyether polyol having a functionality of from 2 to 4.2, an equivalent weight of from 800 to 3000, and an oxyethylene content of from 40 to 77 wt %.

9. The formulation of claim 1, comprising from 52 to 90 weight parts of the isocyanate-terminated prepolymer composition per 100 weight parts of the polyol composition.

10. A polyurethane foam comprising the reaction product of:
   (a) a polyol composition comprising:
      (a1) from 10 to 23 wt % of a first polyoxypropylene polyol having a functionality of from 2 to 3.8 and an equivalent weight of from 85 to 2000;
      (a2) from 3 to 15 wt % of a second polyoxypropylene polyol having a functionality of from 4.5 to 8 and an equivalent weight of from 100 to 175;
      (a3) from 30 to 60 wt % of an ethylene oxide-capped polyether polyol having an equivalent weight of from 70 to 2500 and an oxyethylene content of from 10 to 25 wt %;
      (a4) from 5 to 40 wt % of a copolymer polyol;
      (a5) a latent catalyst; and
      (a6) water; and
   (b) an isocyanate-terminated prepolymer composition, with an isocyanate content of from 10 to 48 wt % based on the total weight of the prepolymer composition, comprising the reaction product of (b1) diphenylmethane diisocyanate, (b2) carbodiimide-modified diphenylmethane diisocyanate, (b3) polymethylene polyphenylisocyanate, and (b4) a third polyether polyol.

11. The polyurethane foam of claim 10, having a density of from 50 to 110 kilograms per cubic meter according to the ASTM D 3574 method.

12. The polyurethane foam of claim 10, having a compression force deflection value of from 5 to 10 kilopascals according to the ASTM D 3574 method.

13. A process for preparing a multilayer structure made of a polyurethane foam comprising:
   placing a polymer film into a mold;
   mixing (a) a polyol composition and (b) an isocyanate-terminated prepolymer composition to form a formulation;
   dispensing the formulation into the mold; and
   curing the formulation to form a polyurethane foam attached to the polymer film;
   wherein (a) the polyol composition comprises, based on the total weight of the polyol composition, (a1) from 10 to 23 wt % of a first polyoxypropylene polyol having a functionality of from 2 to 3.8 and an equivalent weight of from 85 to 2000,
   (a2) from 3 to 15 wt % of a second polyoxypropylene polyol having a functionality of from 4.5 to 8 and an equivalent weight of from 100 to 175,
   (a3) from 30 to 60 wt % of an ethylene oxide-capped polyether polyol having an equivalent weight of from 70 to 2500 and an oxyethylene content of from 10 to 25 wt %,
   (a4) from 5 to 40 wt % of a copolymer polyol,
   (a5) a latent catalyst, and
   (a6) water; and
   (b) the isocyanate-terminated prepolymer composition has an isocyanate content of from 10 to 48 wt % based on the total weight of the prepolymer composition, and comprises the reaction product of (b1) diphenylmethane diisocyanate, (b2) carbodiimide-modified diphenylmethane diisocyanate, (b3) polymethylene polyphenylisocyanate, and (b4) a third polyether polyol.

* * * * *